United States Patent [19]
Kohli et al.

[11] Patent Number: 5,854,152
[45] Date of Patent: Dec. 29, 1998

[54] GLASSES FOR DISPLAY PANELS

[75] Inventors: Jeffrey T. Kohli, Corning, N.Y.; Pascale Laborde, La Grande Paroisse, France

[73] Assignee: Corning Incorporated, Corning, N.Y.

[21] Appl. No.: 988,104

[22] Filed: Dec. 10, 1997

[51] Int. Cl.⁶ ............................ C03C 3/087; C03C 3/091; C03C 3/093
[52] U.S. Cl. ............................ 501/70; 501/56; 501/59; 501/63; 501/64; 501/66; 501/67; 501/69; 501/73; 501/77; 501/78; 345/60
[58] Field of Search .......................... 501/56, 59, 63, 501/64, 66, 67, 70, 73, 77, 78, 69; 345/60

[56] References Cited

U.S. PATENT DOCUMENTS

| | | | |
|---|---|---|---|
| 5,489,558 | 2/1996 | Moffatt et al. | 501/69 |
| 5,508,237 | 4/1996 | Moffatt et al. | 501/69 |
| 5,599,754 | 2/1997 | Maeda et al. | 501/70 |
| 5,631,195 | 5/1997 | Yanagisawa et al. | 501/70 |
| 5,780,371 | 7/1998 | Rifqi et al. | 501/67 |

FOREIGN PATENT DOCUMENTS

| | | |
|---|---|---|
| 3-40933 | 2/1991 | Japan . |
| 8165138 | 6/1996 | Japan . |
| 96/11887 | 4/1996 | WIPO . |

*Primary Examiner*—Michael Marcheschi
*Attorney, Agent, or Firm*—Robert L. Carlson; Scott S. Servilla

[57] ABSTRACT

Glasses for use as substrates for flat panel displays, having a composition consisting essentially of, as calculated in weight percent on an oxide basis, 38–56 $SiO_2$, 10–28 $Al_2O_3$, 0–4 $Li_2O$, 0–6 $Na_2O$, 0–15 $K_2O$, 4–18 CaO, 0–5 MgO, more than 8 and less than or equal to about 24 SrO, 0–2 $ZrO_2$, said glass further consisting essentially of $Na_2O+K_2O$ in total between about 6 and 18 weight percent.

19 Claims, No Drawings

GLASSES FOR DISPLAY PANELS

FIELD OF THE INVENTION

The invention relates to a family of aluminosilicate glass compositions exhibiting physical and chemical properties suitable for use in flat panel displays, in particular plasma display panels (PDPs).

BACKGROUND OF THE INVENTION

There is a rapidly growing interest in flat panel display devices. Thus far, commercial activity has centered on small units such as those used in laptop computers. For this purpose, the liquid crystal display (LCD) device has been the dominant product.

Increasing attention is being given to larger units that may be used in information and entertainment applications. LCDs tend to require critical accuracy in construction and, therefore, do not readily lend themselves to large size screens. Accordingly, as interest shifts to larger size units, attention is being directed to alternative types of display devices.

One such alternative is a plasma display device. In its simplest form, a plasma display device embodies two insulating glass substrates maintained in opposed, spaced relationship. One substrate has anode electrodes formed on its interface. The other substrate has cathode electrodes formed on its interface. The electrodes may be applied in stripes that are perpendicular to one another. They may be printed, or may be formed by a photolithographic process. Barriers are formed between the electrodes in each set to prevent cross talk.

The substrates are maintained in a fixed relationship facing each other. A rare gas, such as neon, argon, or helium is enclosed around and between the electrodes. When a voltage, which may be up to 100 V, is applied between the electrode sets, the gas undergoes a glow discharge. This is based on a principle commonly known as the neon glow discharge principle.

The light generated by this discharge is used to form the image to be formed on the display. The electrodes may contain materials that generate the primary red, green and blue colors under influence of the discharge. In another form, fluorescent phosphors are coated on repeating structures and are affected by the discharge to produce the desired colors. Typically, the gas discharge generates UV light which excites the phosphors, which in turn give off RGB light in the visible region of the spectrum.

Heretofore, the insulating substrates commonly employed in emissive display devices have been sheets of soda lime glass. Soda lime glasses have been used because they provide a relatively high coefficient of thermal expansion (CTE), thereby more closely matching the expansion of glass frits typically used in producing electrodes and barriers in a display device.

For example, the electrodes and barriers may be applied as a paste and dried or fired. The paste will contain a conductive component, such as a metal powder, a low melting point glass frit, and organics as a solvent and as a binder. The dried paste is fired to burn out any residual organic and to soften the glass frit to adhere to the substrate.

While traditional soda lime glasses have the necessary high CTEs, they also have low strain points and low resistivities. Consequently, a soda lime substrate may shrink and/or undergo distortion during thermal processing. This processing includes firing the electrodes and/or sealing the substrates together. The high soda content also leads to sodium ion migration which degrades the display electronics (e.g. electrodes).

It would, therefore, be desirable to provide a glass substrate having a CTE of $79°-88°\times10^{-7}/°C$. over the range of $25°-300°$ C. and a strain point greater than $600°$ C. At the same time, it would be desirable for the glass to be capable of being manufactured using the float process.

SUMMARY OF THE INVENTION

One aspect of the present invention relates to a relatively barium-free glass having a coefficient of thermal expansion over the temperature range of $25°-300°$ C. between 60 and $90\times10^{-7}/°C.$, and a strain point higher than $600°$ C., whose composition consists essentially of, as calculated in weight percent on an oxide basis, 38–56 $SiO_2$, 10–28 $Al_2O_3$, 4–18 CaO, more than 8 and less than or equal to about 24 SrO, 0–5 MgO, 0–5 $ZrO_2$, 0–5 BaO, 0–5 $B_2O_3$, 0–4 $Li_2O$, 0–6 $Na_2O$, 0–15 $K_2O$, with $Na_2O$ and $K_2O$ in combination preferably being between about 5 and 18.

The present glasses employ 38–56% by weight $SiO_2$ as the primary glass former. Increasing $SiO_2$ content generally improves durability, but raises the melting and forming temperatures. The glasses also comprise 10–28% $Al_2O_3$. As the $Al_2O_3$ content increases, glass durability increases, but CTE decreases and the melting and forming temperatures increase. Alkali are used in order to maintain a high coefficient of thermal expansion (CTE). Other optional ingredients may include, for example, the transition metal oxides, particularly those in period 4 (such as ZnO and $TiO_2$), as well as $Y_2O_3$, $La_2O_3$, and $P_2O_5$, and those ingredients employed for fining (e.g. $CaSO_4$, $NaSO_4$, halides, and so forth). These other ingredients should preferably not exceed 5 weight percent in total, and most preferably should be less than or equal to 3 weight percent in total.

The preferred glasses are those which consist essentially of (expressed in weight percent): 38–53 $SiO_2$, 14–28 $Al_2O_3$, 4–14 CaO, 10–20 SrO, 0–5 MgO, 0–5 $ZrO_2$, 0–5 BaO, 0–5 $B_2O_3$, 0–4 $Li_2O$, 1–5 $Na_2O$, 0–15 $K_2O$, with $Na_2O$ and $K_2O$ in combination preferably being between about 5 and 10. Preferably, such glasses contain no more than 3 wt % of the optional ingredients listed above.

The most preferred glasses are those which consist essentially of (expressed in weight percent): 38–50 $SiO_2$, 15–26 $Al_2O_3$, 8–12 CaO, 15–19 SrO, 0–3 MgO, 0–4 $ZrO_2$, 0–2 BaO, 0–3 $B_2O_3$, 0–2 $Li_2O$, 2–5 $Na_2O$, 3–7 $K_2O$, and $Na_2O+K_2O$ in combination preferably being between 6 and 10.

The role of MgO and CaO is to limit alkali mobility and flux the melt at relatively high temperatures, while helping to provide a high strain point and low density, and enhance chemical durability and Young's modulus.

The preferred glasses claimed in the present invention utilize substantial amounts of alkali plus SrO and CaO, i.e. $Li_2O+Na_2O+K_2O+SrO+CaO$, greater than or equal to about 26, and more preferably greater than or equal to about 30 weight percent, in order to maintain high values of the expansion coefficient. Up to 5 wt % of MgO may be tolerated but preferably the amount of MgO is less than 3 weight percent, and most preferably MgO is essentially avoided because it may cause phase separation in the glass and because it lowers the CTE excessively.

The total of $SiO_2+Al_2O_3$ in the glasses of the present invention is preferably between about 60 and 68, more preferably between about 61 and 67, and most preferably between about 62 and 66 weight percent. The preferred glasses in accordance with the present invention have a CTE in the range of 60–90×10⁻⁷/°C., more preferably 70–90×10⁻⁷/°C., and most preferably 79–88×10⁻⁷/°C. over the temperature range of 25°–300° C. The desire for such a CTE is primarily driven by the desire to match the CTEs of glass frits used in electrodes, barrier ribs, overcoats, sealing operations, and other materials. The glasses of the present invention preferably have a strain point greater than 600° C., more preferably greater than about 625° C., and most preferably greater than about 650° C. A high strain point is desired to help prevent panel distortion due to compaction/shrinkage during subsequent thermal processing. Such processing includes firing of electrodes, sealing of panels and application of coatings. In the most preferred embodiments, the glasses exhibit a combination of desirable CTE's and strain point. For example, the most preferred glasses exhibit a CTE in between 79–88×10⁻⁷/°C., in combination with a strain point greater than 625° C., and most preferably greater than about 650° C. The glasses of the present invention also exhibit low density (less than 3.0 g/cm³, more preferably less than 2.8 g/cm³) in order to minimize display weight, relatively high resistivity (log resistivity greater than or equal to 8 ohm·cm. at 250° C., more preferably greater than or equal to 10 ohm·cm at 250° C.) in order to ensure extended display lifetimes. These glasses also exhibit good chemical durability and optical clarity, as well as low batch cost. As a means to optimize the market opportunity for PDP's it is desirable that the batch cost of a PDP glass composition should preferably be low, and it is believed that the most economical means of panel/substrate manufacture is the float glass process. The present invention disclosure outlines a glass compositional area which is believed to be ideally suited for substrates for plasma display panels. It is believed that many of the glasses of the present invention are capable of being formed using the float glass manufacturing process.

$ZrO_2$ is preferably maintained at below about 5 weight percent, and more preferably below about 3 weight percent. Likewise, $B_2O_3$ is preferably maintained at below about 5 weight percent, and more preferably below about 3 weight percent.

The glass compositions claimed herein are preferably barium-free in order to avoid surface crystallization of barium sulfate when sulfur and barium are simultaneously present in the glass or at the interface, when sulfur is introduced for fining purposes in the composition, or present as an impurity in the raw materials (especially in common grade barium carbonate and strontium carbonate), or present in the atmosphere of the lehr in the float process. These barium sulfate defects are formed during the thermal heat treatments on glass to limit its compaction and are particularly detrimental for the glass coatings deposited on the glass surface. Strontium oxide is believed to be less mobile than barium oxide within the glass structure and can therefore be present in the glass composition. By barium-free, it is meant that the glasses contain less than 2 wt % barium, and more preferably are essentially free of barium.

It should be recognized that by increasing the modifier to alumina ratio, the strain point of the glass will be lowered, in general. However, there is an optimum balance between strain point, expansion coefficient, density, durability, resistivity, meltability and formability, all of which are heavily impacted by the variation in the modifier to alumina ratio and the value of $SiO_2+Al_2O_3$.

DETAILED DESCRIPTION OF THE INVENTION

The invention is further illustrated by the following examples, which are meant to be illustrative, and not in any way limiting, to the claimed invention. Table I records a number of glass compositions, expressed in terms of parts by weight on the oxide basis, illustrating the compositional parameters of the present invention. Inasmuch as the sum of the individual constituents totals or very closely approximates 100, for all practical purposes the reported values may be deemed to represent weight percent. The actual batch ingredients may comprise any materials, either oxides or other compounds, which, when melted together with the other batch components, will be converted into the desired oxide in the proper proportions. For example, $SrCO_3$ and $CaCO_3$ can provide the source of SrO and CaO, respectively.

These example glasses were prepared by melting 1000–5000 gram batches of each glass composition in platinum crucibles at a temperature and time to result in a relatively homogeneous glass composition, e.g. at a temperature of about 1450°–1600° C. for a period of about 4 to 16 hours. Table I also lists measurements of several chemical and physical properties determined on the glasses in accordance with techniques conventional in the glass art. Thus, the softening point (soft pt.), annealing point, and strain point expressed in terms of °C., were determined by beam bending viscometry (in the case of annealing point and strain point) or parallel plate viscometry (in the case of softening point). The linear coefficient of thermal expansion (CTE) over the temperature range 25°–300° C. expressed in terms of ×10⁻⁷/°C. was measured using dilatometry. Also listed is density, in g/cm³.

TABLE I wt %

| | 1 | 2 | 3 | 4 |
|---|---|---|---|---|
| $SiO_2$ | 48.1 | 53.9 | 55.3 | 42.5 |
| $Al_2O_3$ | 16.1 | 10.8 | 10.1 | 21.5 |
| Na2O | 3.1 | 1.5 | 1.5 | 3.1 |
| $K_2O$ | 4.7 | 10.2 | 11.6 | 4.8 |
| CaO | 10.3 | 6 | 5.3 | 10.4 |
| SrO | 17.3 | 16.2 | 14.1 | 17.5 |
| $ZrO_2$ | 0 | 1.3 | 2 | 0 |
| Soft Pt (°C.) | 874 | | | 885 |
| Annea Pt (°C.) | 690 | 691 | 686 | 701 |
| Strain Pt (°C.) | 643 | 650 | 644 | 656 |
| CTE × 10⁻⁷/°C. | 81.8 | 80.1 | 86.3 | 81.1 |
| Density (g/cm³) | 2.84 | 2.75 | 2.74 | 2.85 |
| Liquidus Temp (°C.) | 1175 | 1315 | 1310 | 1310 |
| Log resistivity at 250° C. (oh5m · cm) | 11.0 | | | |

| | 5 | 6 | 7 | 8 | 9 |
|---|---|---|---|---|---|
| $SiO_2$ | 39.2 | 46.1 | 46.8 | 44.9 | 38.8 |
| $Al_2O_3$ | 25.4 | 15.5 | 13.2 | 19.0 | 25.1 |
| Na2O | 3.7 | 1.5 | 1.5 | 1.5 | 3.1 |
| $K_2O$ | 5.7 | 12.9 | 10.5 | 14.6 | 4.8 |
| CaO | 9.6 | 7.0 | 6.0 | 6.0 | 10.4 |
| SrO | 16 | 16 | 20 | 12 | 17.5 |
| $ZrO_2$ | 0 | 0 | 0 | 2 | 0 |
| BaO | | | | | 0.3 |
| Soft Pt (°C.) | 898 | | | | 904 |
| Annea Pt (°C.) | 710 | 713 | 703 | 726 | 713 |
| Strain Pt (°C.) | 664 | 671 | 661 | 683 | 669 |
| CTE × 10⁻⁷/°C. | 81.3 | 90.3 | 89.9 | 91.3 | 80.0 |
| Density (g/cm³) | 2.83 | 2.79 | 2.85 | 2.73 | 2.87 |
| Liquidus Temp (°C.) | 1280 | 1380 | 1355 | 1390 | 1100 |
| Log resistivity at 250° C. | | | | | 12.0 |

Glasses having the compositions and properties as shown in Examples 1 and 9 are currently regarded as representing the best mode of the invention, that is, as providing the best combination of properties and manufacturability for the purposes of the invention at this time.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A substrate for a flat panel display device wherein said substrate is comprised of a flat, transparent glass exhibiting a linear coefficient of thermal expansion over the temperature range 25°–300° C. between $60-90 \times 10^{-7}/°C$. and a strain point higher than 600° C., said glass consisting essentially of, expressed in terms of weight percent on an oxide basis, 38–56 $SiO_2$, 16.1–28 $Al_2O_3$, 4–18 CaO, more than 10 and less than or equal to about 24 SrO, 0–5 MgO, 0–5 $ZrO_2$, 0–5 BaO, 0–5 $B_2O_3$, 0–4 $Li_2O$, 0–6 $Na_2O$, 0–15 $K_2O$, said glass further consisting essentially in total amount of $Na_2O+K_2O$ between about 5 and 18 weight percent.

2. A substrate according to claim 1, wherein said glass has a CTE of $79-88 \times 10^{-7}/°C$.

3. A substrate according to claim 2, wherein said glass has a strain point over 650° C.

4. An emissive flat panel display comprising the substrate according to claim 1.

5. A substrate according to claim 1, further consisting essentially of at least one optional component selected from the group consisting of transition metal oxides, $Y_2O_3$, $La_2O_3$, $P_2O_5$, sulfates, and halides, in a total amount not exceeding 5 weight percent.

6. A substrate according to claim 5, wherein said optional ingredients are present in a total amount not exceeding 3 weight percent.

7. A substrate according to claim 5, wherein $SiO_2$ and $Al_2O_3$ are present in a total amount between about 60 and 68 weight percent.

8. A substrate according to claim 7, wherein $SrO+CaO+Li_2O+Na_2O+K_2O$ are present in a total amount greater than 26 weight percent.

9. A substrate according to claim 1, wherein said glass consists essentially, as expressed in terms of weight percent on an oxide basis, 38–53 $SiO_2$, 16.1–28 $Al_2O_3$, 4–14 CaO, at most 20 SrO, 0–5 MgO, 0–5 $ZrO_2$, 0–5 BaO, 0–5 $B_2O_3$, 0–4 $LiO_2$, 1–5 $Na_2O$, 0–15 $K_2O$, said glass further consisting essentially of $Na_2O+K_2O$ in a total amount between 5 and 10 weight percent.

10. A substrate according to claim 9, wherein said glass has a CTE of $79-85 \times 10^{-7}/°C$.

11. A substrate according to claim 10, wherein said glass has a strain point over 650° C.

12. A substrate according to claim 1, wherein said glass consists essentially, as expressed in terms of weight percent on an oxide basis, of 38–50 $SiO_2$, 16.1–26 $Al_2O_3$, 8–12 CaO, 15–19 SrO, 0–3 MgO, 0–3 $ZrO_2$, 0–2 BaO, 0–3 $B_2O_3$, 0–2 $Li_2O$, 2–5 $Na_2O$, 3–7 $K_2O$, and $Na_2O+K_2O$ in a total amount between 6 and 10 weight percent.

13. A substrate according to claim 12, wherein $SiO_2$ and $Al_2O_3$ are present in a total amount of between about 60 and 68 weight percent.

14. A substrate according to claim 13, wherein $SrO+CaO+Li_2O+Na_2O+K_2O$ are present in a total amount greater than 26 weight percent.

15. A glass exhibiting a linear coefficient of thermal expansion over the temperature range 25°–300° C. between $60-90 \times 10_{-7}/°C$. and a strain point higher than 600° C., said glass consisting essentially of, expressed in terms of weight percent on an oxide basis, 38–56 $SiO_2$, 16.1–28 $Al_2O_3$, 4–18 CaO, more than 10 and less than or equal to about 24 SrO, 0–5 MgO, 0–5 $ZrO_2$, 0–5 BaO, 0–5 $B_2O_3$, 0–4 $Li_2O$, 0–6 $Na_2O$, 0–15 $K_2O$, $Na_2O+K_2O$ in a total amount of between 6 and 18 weight percent, and optional ingredients selected from the group consisting of transition metal oxides, $Y_2O_3$, $La_2O_3$, $ZrO_2$, and $P_2O_5$, in a total amount not exceeding 5 weight percent.

16. A glass according to claim 15, wherein $Li_2O+Na_2O+K_2O$ are present in a total amount of between 6 to 16 weight percent.

17. A glass according to claim 16, wherein said glass has a CTE of $79-88 \times 10^{-7}/°C$.

18. A glass according to claim 17, wherein said glass has a strain point over 650° C.

19. A glass according to claim 17, wherein $B_2O_3$ is essentially omitted.

* * * * *